United States Patent Office 3,081,784
Patented Mar. 19, 1963

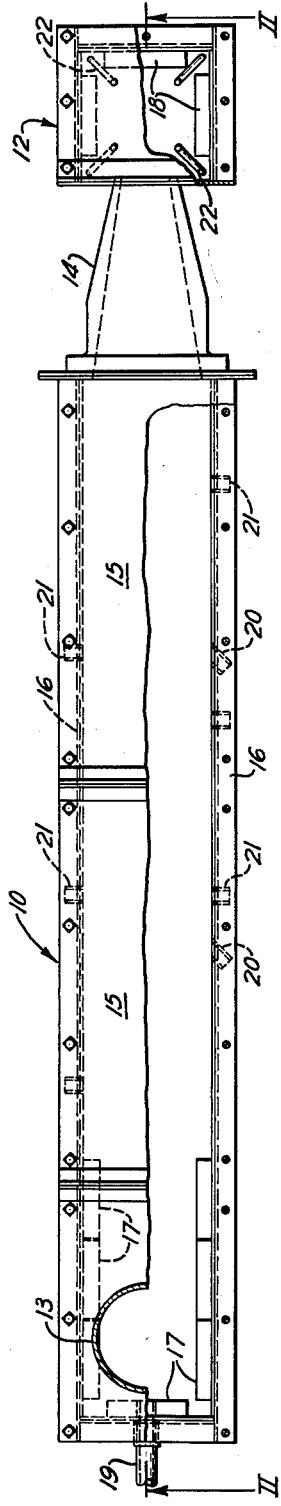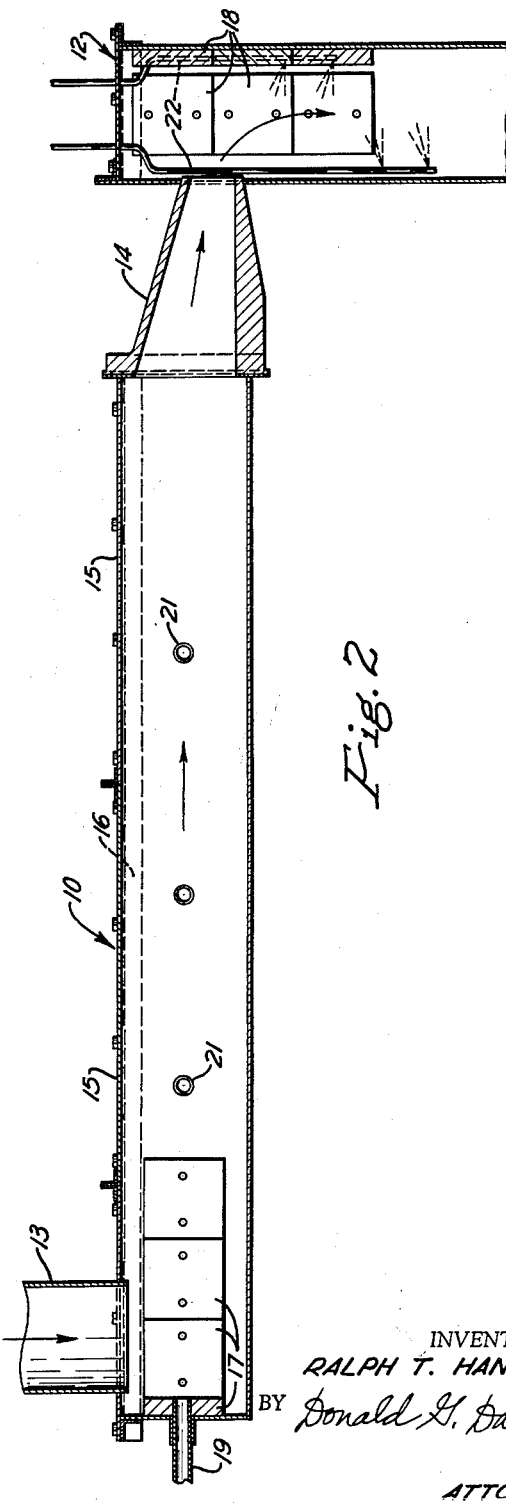
INVENTOR.
RALPH T. HANNA
BY Donald G. Dalton
ATTORNEY

3,081,784
APPARATUS FOR HANDLING AND
WETTING DUST
Ralph T. Hanna, Yardley, Pa., assignor to United States
Steel Corporation, a corporation of New Jersey
Filed Apr. 6, 1961, Ser. No. 101,229
2 Claims. (Cl. 134—199)

This invention relates to an improved apparatus for handling and wetting dust or similar pulverulent material.

Although the invention is not thus limited, the apparatus is particularly useful for handling and wetting dust recovered from a blast furnace. Conventionally a blast furnace is equipped with a dust catcher which recovers fine dust from the off-gas. The dust collects in a bin or hopper from which it is removed and hauled away periodically. The dust must be wetted to form a sludge before it can be handled in the open. In many installations headroom is limited, necessitating the use of equipment of relatively short vertical dimensions. Another difficulty is that foreign bodies, such as loose bricks, sometimes fall into the dust-wetting apparatus, and there is no provision for removing them.

An object of my invention is to provide an improved apparatus of simple construction and short vertical dimensions for effectively wetting dust or the like and delivering the resulting sludge to a suitable receiver.

A further object is to provide an improved dust collecting apparatus which includes a horizontally elongated mixing chamber wherein steam and water are introduced to the dust and a vertical outlet chamber wherein additional water is introduced, and which can be opened readily for removal of foreign bodies.

In accomplishing these and other objects of the invention, I have provided improved details of structure, a preferred form of which is shown in the accompanying drawing, in which:

FIGURE 1 is a top plan view with parts broken away of my dust handling apparatus, and FIGURE 2 is a vertical section on line II—II of FIGURE 1.

My dust handling apparatus comprises a horizontally elongated mixing chamber 10 and a vertically extending outlet chamber 12, both of rectangular across section and formed of rigidly connected metal plates. A vertical dust inlet pipe 13 is connected to the top of the mixing chamber 10 adjacent the left end. A tapered nozzle 14 connects the right end of the mixing chamber 10 with the upper portion of the outlet chamber 12. The top wall of the mixing chamber 10 is formed of a plurality of cover plates 15 removably bolted to angle iron flanges 16 at the upper edges of the side walls. This arrangement permits access to the interior of the chamber, as for cleaning or removing bricks or the like which occasionally drop into the chamber. A series of wear plates 17 line the interior of the mixing chamber 10 adjacent its inlet end. Another series of wear plates 18 line the interior of the outlet chamber 12 adjacent its upper end. The wear plates are of abrasion resistant material, such as cast steel, and hence protect the chamber walls.

A steam inlet 19 is connected to the left end of the mixing chamber 10. Supplementary steam inlets 20 can be connected into the side walls of this chamber, preferably extending at about 45° to the plane of the wall. A series of water inlets 21 also are connected into each side wall of the mixing chamber, three on each side in the structure illustrated. Vertical water pipes 22 extend inside the outlet chamber 12 along the four vertical edges thereof, and have series of spray openings directed inwardly of the chamber. The steam inlets 19 and 20 and the water inlets 21 and pipes 22 are connected to suitable steam and water sources, not shown.

In operation, I introduce dust periodically to the mixing chamber 10 via the inlet pipe 13. In a typical installation this pipe extends to a dust catcher, not shown. When a predetermined quantity of dust has collected in the dust catcher, I open a valve to enable the dust to flow through pipe 13 into the chamber. At the same time I introduce a jet of steam through the inlet 19 and additional jets of steam through the supplementary inlets 20 if used. The steam carries the dust lengthwise of the mixing chamber 10, through the nozzle 14 and into the outlet chamber 12. I also introduce water through the inlets 21 and pipes 22. Preferably the water streams are directed at right angles to the dust flow to afford maximum turbulence. The water wets the dust to form a sludge, which drops from the bottom of the outlet chamber into a suitable receiver, not shown.

From the foregoing description, it is seen that my invention affords a simple effective apparatus for handling and wetting dust. The apparatus has relatively short vertical dimensions, thus enabling it to be installed in locations where headroom is restricted. Foreign bodies which drop into the apparatus are readily removed on removal of the cover sections.

While I have shown and described only a single embodiment of my invention, it is apparent that modifications may arise. Therefore, I do not wish to be limited to the disclosure set forth but only by the scope of the appended claims.

I claim:

1. A dust handling apparatus comprising walls forming a horizontally elongated mixing chamber and a vertical outlet chamber, one wall of said mixing chamber being formed of removable sections to permit access to the interior, a tapered nozzle connecting one end of said mixing chamber with the upper end of said outlet chamber, a dust inlet connected to the top of said mixing chamber adjacent the other end thereof, a steam inlet in the end of said mixing chamber adjacent said dust inlet for introducing steam to carry dust along the length of said mixing chamber through said nozzle into said outlet chamber, supplementary steam inlets in the side walls of said mixing chamber, water inlets in the side walls of said mixing chamber directed at right angles to the direction of dust flow for introducing water with turbulence to wet the dust, and spaced apart vertically extending water pipes located inside said outlet chamber adjacent the vertical walls thereof, said pipes having a series of spray openings directed inwardly of said outlet chamber for introducing water to further wet the dust.

2. An apparatus as defined in claim 1 in which both chambers are of rectangular cross section and in which said water pipes extend along the edges of said outlet chamber.

References Cited in the file of this patent
UNITED STATES PATENTS

| | | |
|---|---|---|
| 502,181 | Fauvel | July 25, 1893 |
| 1,017,275 | Walker | Feb. 13, 1912 |
| 1,117,814 | Dutton | Nov. 17, 1914 |
| 2,278,701 | Karr | Apr. 7, 1942 |
| 2,686,192 | Bonotto | Aug. 10, 1954 |

FOREIGN PATENTS

| | | |
|---|---|---|
| 372,684 | Germany | Mar. 31, 1923 |